(12) United States Patent
Okuno

(10) Patent No.: US 7,307,946 B2
(45) Date of Patent: Dec. 11, 2007

(54) PROTECTION SYSTEM, VIRTUAL CONCATENATION PROCESSING BLOCK, NODE AND RING NETWORK

(75) Inventor: Eriko Okuno, Tokyo (JP)

(73) Assignee: NEC Corporation, Tokyo (JP)

( * ) Notice: Subject to any disclaimer, the term of this patent is extended or adjusted under 35 U.S.C. 154(b) by 946 days.

(21) Appl. No.: 10/157,701

(22) Filed: May 29, 2002

(65) Prior Publication Data

US 2002/0181479 A1   Dec. 5, 2002

(30) Foreign Application Priority Data

May 30, 2001   (JP)   ............................. 2001-163250

(51) Int. Cl.
*H04L 12/26*   (2006.01)
(52) U.S. Cl. ...................... 370/222; 370/242
(58) Field of Classification Search ............... None
See application file for complete search history.

(56) References Cited

U.S. PATENT DOCUMENTS

| 5,333,130 | A |   | 7/1994 | Weissmann et al. |
| 5,818,816 | A | * | 10/1998 | Chikazawa et al. ......... 370/225 |
| 5,986,783 | A |   | 11/1999 | Sharma et al. |
| 6,917,630 | B1 | * | 7/2005 | Russell et al. ............... 370/532 |
| 6,940,808 | B1 | * | 9/2005 | Shields et al. .............. 370/216 |
| 6,975,589 | B2 | * | 12/2005 | Luft et al. ................... 370/222 |
| 7,016,300 | B2 | * | 3/2006 | Luft et al. ................... 370/221 |
| 2002/0181392 | A1 | * | 12/2002 | Okuno ........................ 370/216 |
| 2005/0175004 | A1 | * | 8/2005 | Russell et al. .............. 370/389 |
| 2005/0244158 | A1 | * | 11/2005 | Luft ............................ 370/222 |

FOREIGN PATENT DOCUMENTS

| EP | 1 128 584 A2 | 2/2001 |
| GB | 2386486 A | 9/2003 |
| JP | 11-168487 | 6/1999 |
| JP | 2000-269999 | 9/2000 |
| WO | WO 98/38829 | 9/1998 |
| WO | WO 00/07313 | 2/2000 |

* cited by examiner

*Primary Examiner*—Chi Pham
*Assistant Examiner*—Anh-Vu Ly
(74) *Attorney, Agent, or Firm*—Scully, Scott, Murphy & Presser, P.C.

(57) ABSTRACT

A protection system, a virtual concatenation processing block, a node and a ring network, in which bands of ring network system are effectively utilized when no failure occurs on the network, and all data can be transmitted to destinations using an LCAS function even when failure occurs. When no failure occurs on the network, a working channel and a protection channel are treated as a continuous band by the LCAS function and working traffic is transmitted using the band by a virtual concatenation function. When failure occurs on the network, the channels of paths prepared by cooperating a layer 1 protection function and the LCAS function to avoid a troubled part are used for data transmission, and the working traffic is transmitted through the band by the virtual concatenation function.

12 Claims, 13 Drawing Sheets

F I G. 6
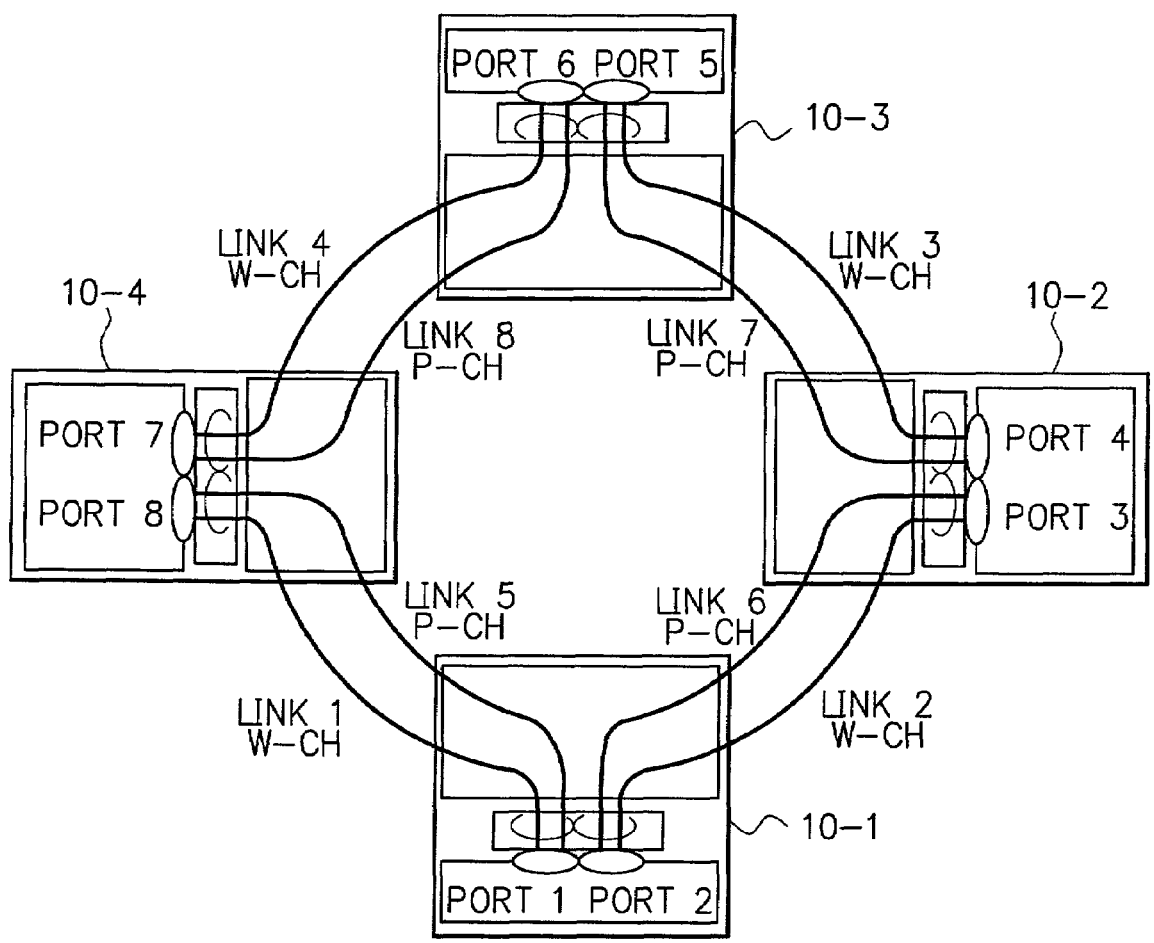

F I G. 8
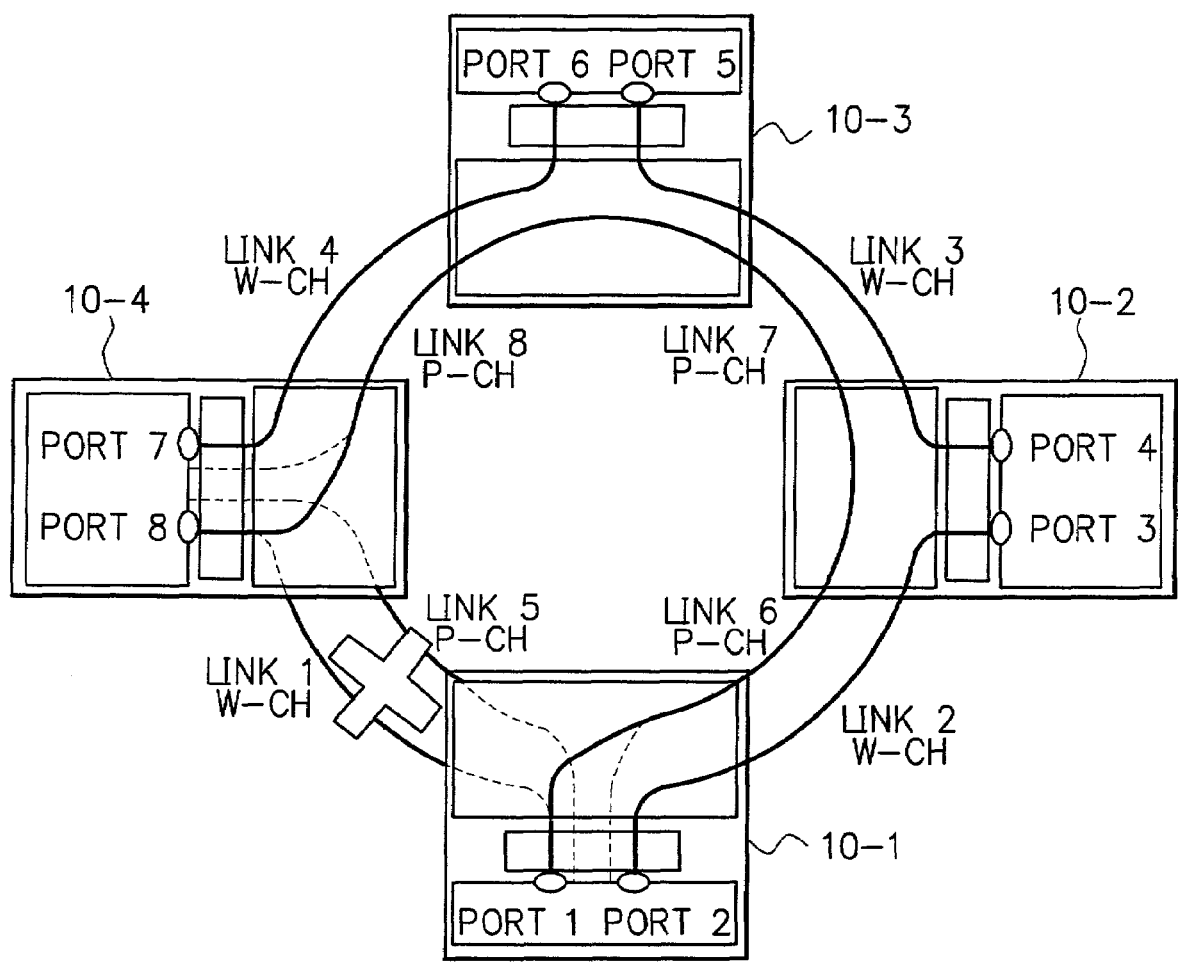

FIG. 10
(a) K4 BIT 1 MULTI-FRAME
EXTENDED SIGNAL LABEL: LABEL EXHIBITING VIRTUAL CONCATENATION IS GIVEN
(b) K4 BIT 2 LOW ORDER VIRTUAL CONCATENATION 32-BIT STRING
※1 FRAME COUNT: SHOW MULTI-FRAME NO.0-13
※2 SEQUENCE INDICATOR: SHOW SEQUENCE NO.0-63
(c) Z7[2] VTN-TX SUPPORTING LCAS CODING
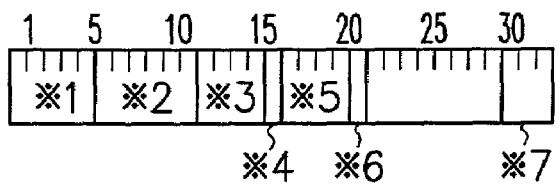
※1 FRAME COUNT
※2 SEQUENCE INDICATOR
※3 CTAL: LCAS CONTROL WORD
※4 GID: GROUP IDENTIFICATION
※5 MEMBER STATUS
※6 RS-ASK
※7 CRC F I G. 11
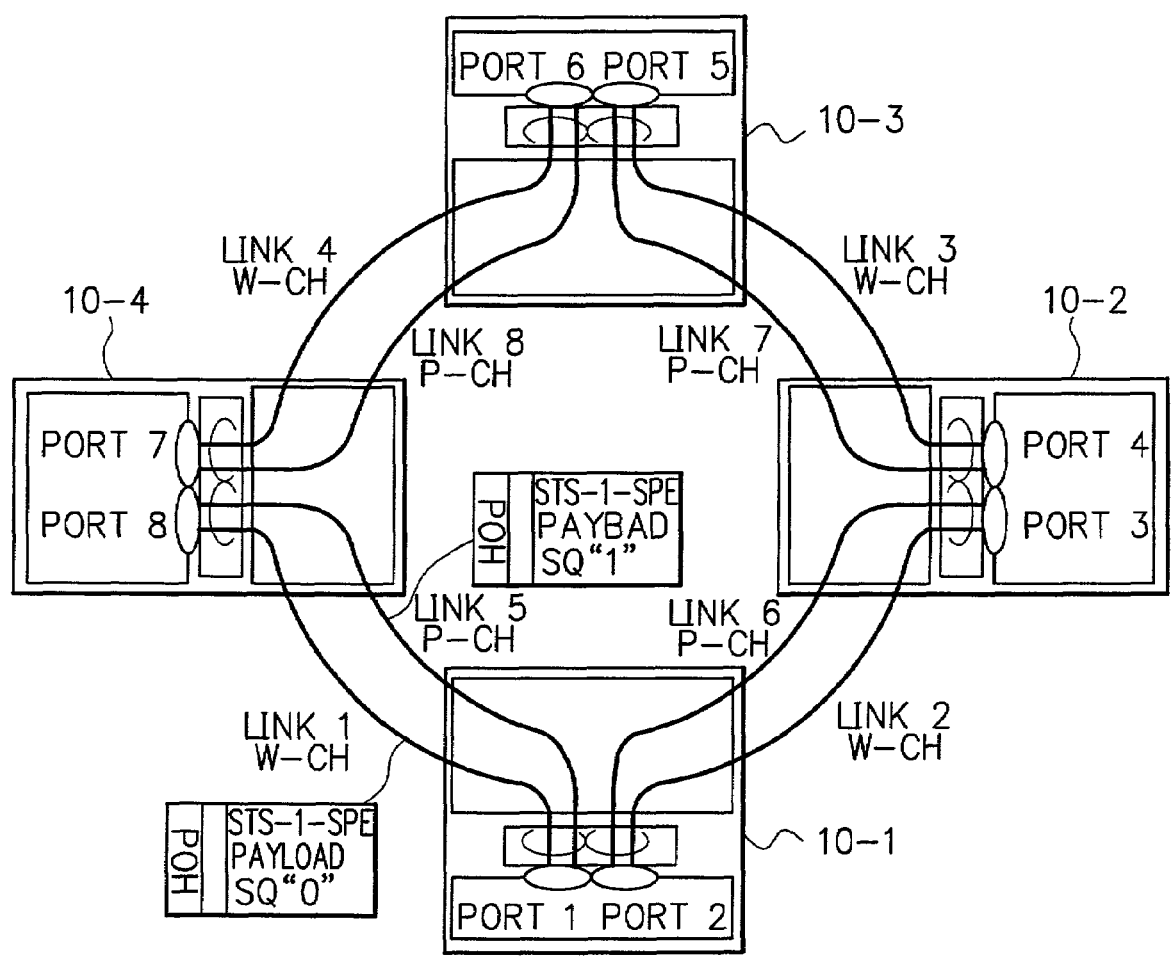

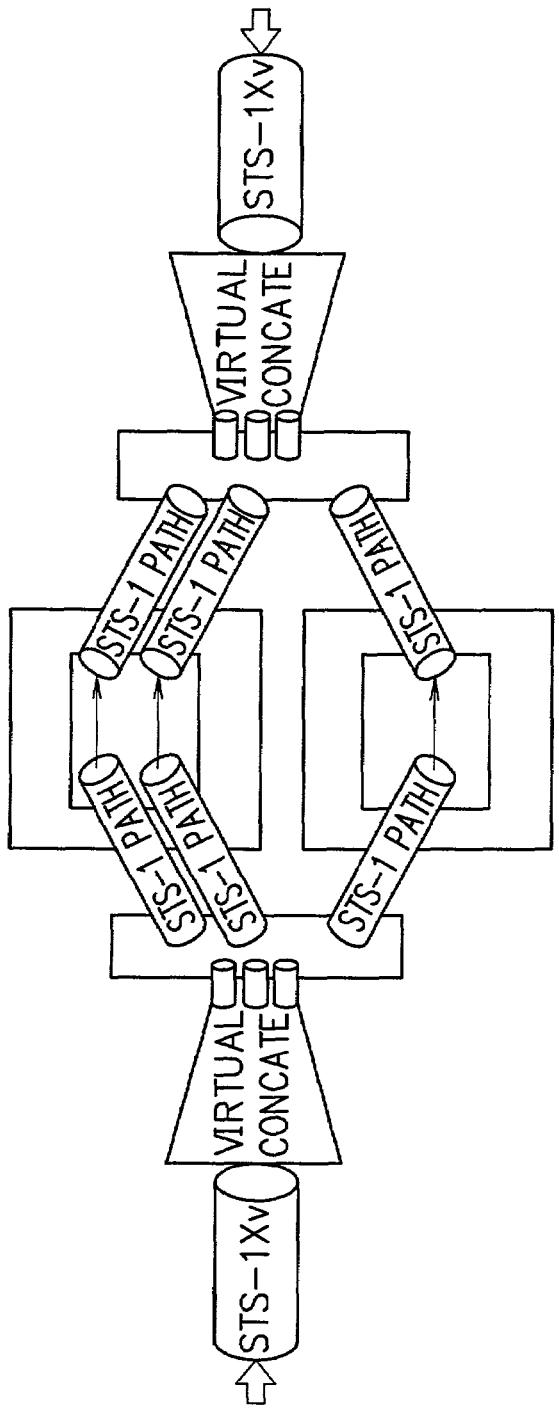
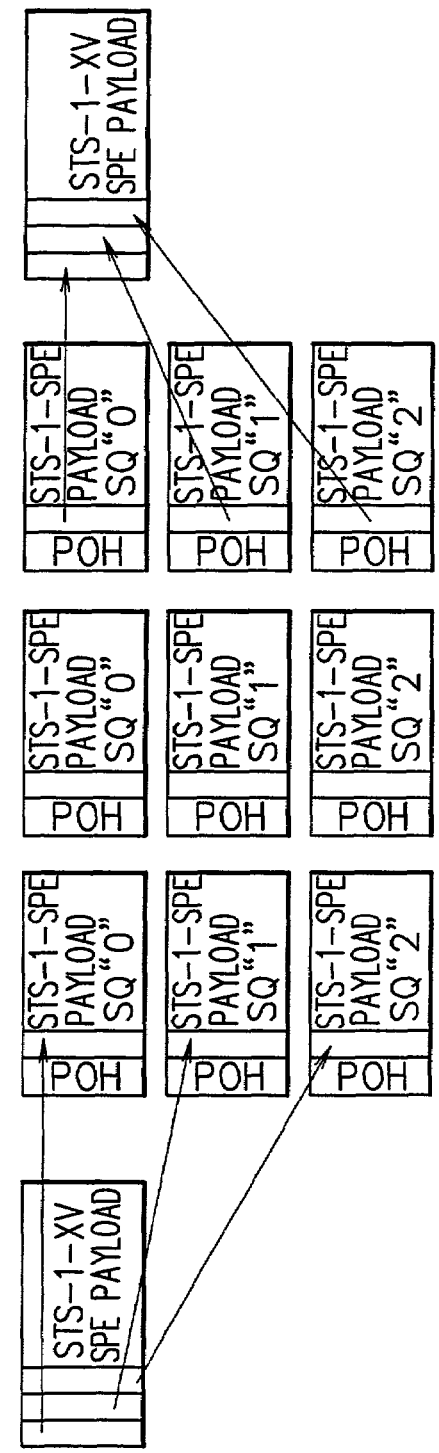
F I G. 12
(a)
(b)

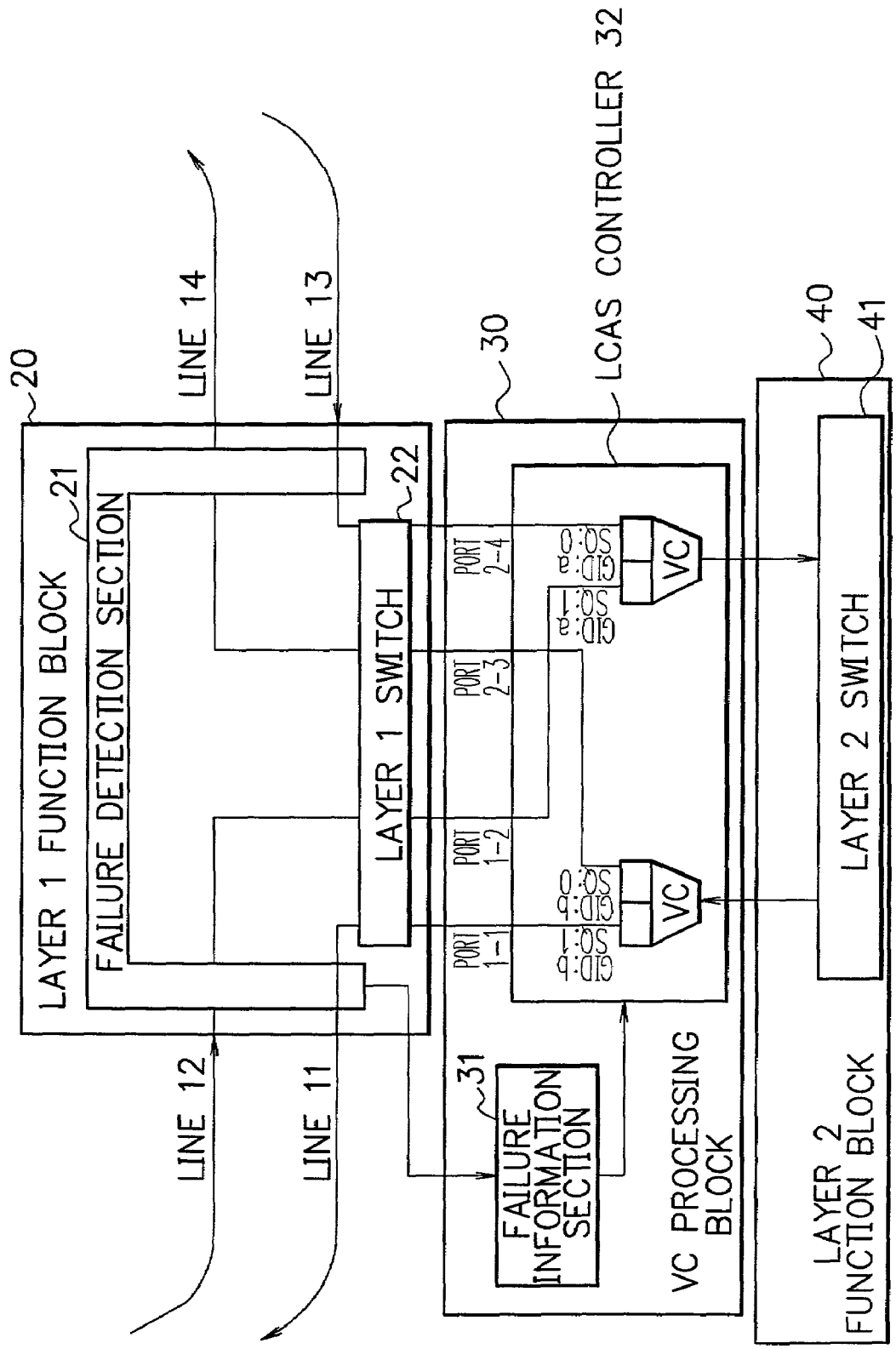

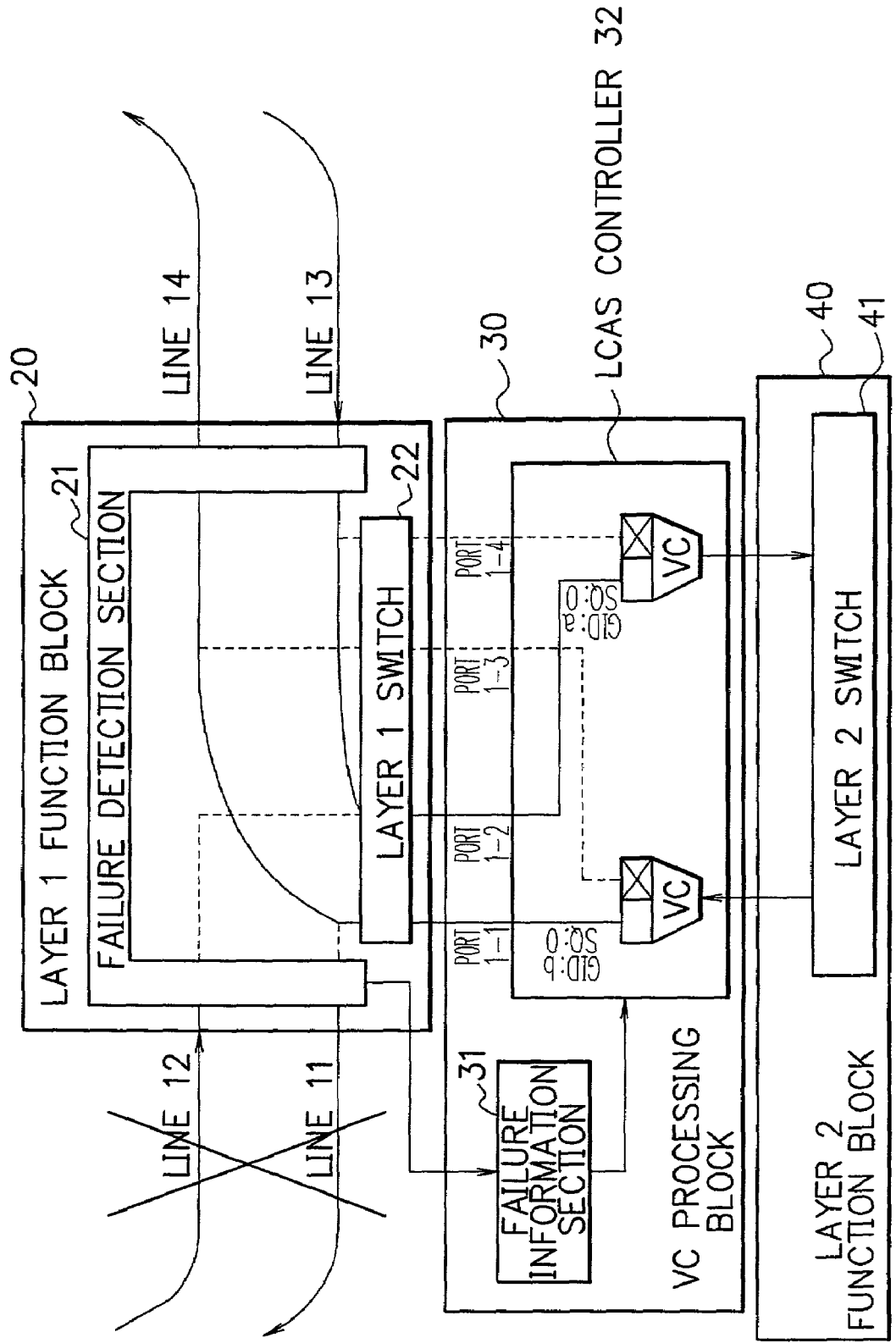

PROTECTION SYSTEM, VIRTUAL CONCATENATION PROCESSING BLOCK, NODE AND RING NETWORK

BACKGROUND OF THE INVENTION

The present invention relates to a protection system, a virtual concatenation processing block, a node and the ring network, in which virtual concatenation process and link capacity adjustment scheme (LCAS) process are carried out on the ring network to exploit bands or channels effectively, and more particularly to a protection system, a virtual concatenation processing block, a node and a ring network, in which traffic sent to a protection channel by virtual concatenation process and LCAS process when no failure occurs on the network can be transmitted even when failure occurs on the network.

DESCRIPTION OF THE RELATED ART

Some conventional ring networks composed of a plurality of nodes connected by transmission lines or links in a ring form are provided with protection channels for a failure occurrence. When a failure occurs in the network, the channel being used is switched from a working channel to the protection channel to pass working traffic to the protection channel.

Examples of the ring network include BLSR (Bidirectional Line Switch Ring) and UPSR (Uni-directional Protection Switch Ring) of SONET/SDH (Synchronous Optical NETwork/Synchronous Digital Hierarchy).

In the BLSR network, a plurality of nodes are connected by transmission lines in a ring form, and each two adjacent nodes are coupled by two channels: a working channel and a protection channel. When no failure occurs on the network, the nodes are linked by the working channel. When a failure occurs on the transmission line of the working channel, the route is changed to the protection channel placed on another transmission line to transmit traffic on the network. The nodes may be connected by four channels: two working channels and two protection channels each for bidirectional communication.

FIGS. 1 to 3 illustrate concrete examples of the conventional BLSR network and the operation of layer 1 protection process when a failure occurs on the network.

In FIG. 1, six nodes A to F are connected by transmission lines or links of four channels in the BLSR network capable of bidirectional communication. When no failure occurs in the network, data is transmitted by using two working channels 50a (solid lines). In this example, a path for transmitting data from the node C to the node F via the nodes D and E is set using the working channel 50a when no failure occurs on the network.

As shown in FIG. 2, when a failure occurs on a link between the nodes C and D, the nodes C and D that are directly connected to the troubled link (link on which failure occurred) turn back all the paths to avoid the troubled link. More specifically, each of the nodes C and D turns back the working channel 50a to the protection channel 50b transmitting data in the opposite direction to the transmission direction of the working channel 50a at the untroubled links (the links between the nodes B and C, and between the nodes D and E). That is, all the paths are turned back at the nodes C and D adjacent to the troubled link to set up a new path route to the destination node F via the untroubled links.

Hence, the data to be sent from the node C to the node F is first sent from the node C to the node D through the nodes B, A, F and E via the protection channel 50b, is then turned back to the working channel 50a at the node D and is sent to the node F through the node E via the working channel 50a. This channel turn-back process to avoid the troubled part is called ring switch process.

Besides, as shown in FIG. 3, when a failure occurs on the working channel 50a for transmitting the data from the node D to the node E, a path for avoiding the working channel 50a is built using the protection channel 50b. That is, the data is sent from the node D to the node E by using the protection channel 50b present between the same two nodes D and E in the same transmission direction as that of the troubled working channel 50a. This is called span switch process.

In a UPSR network, a plurality of nodes are connected by transmission lines in a ring form and two adjacent nodes are coupled by two channels: a working channel and a protection channel transmitting data in the opposite direction to the data transmission direction of the working channel. The nodes may be connected by four channels: two working channels transmitting data in the opposite directions and two protection channels transmitting data in the opposite directions.

FIG. 4 shows a control of the conventional UPSR network. In this network, data is transmitted in the counter-clockwise direction on a working channel 51 and in the clockwise direction on a protection channel 52. Further, as described above, in the UPSR network, the nodes can be connected by four channels: two working channels and two protection channels each for bidirectional communication.

In FIG. 4, when the data is sent from the node A to the node C, the data is passed to both the working channel 51 and the protection channel 52. When no failure occurs on the working channel 51, the node C receives the data from the working channel. When a failure occurs on the working channel 51, the node C receives the data from the protection channel 52.

However, the conventional ring network in which the data can be transmitted between the nodes by using the protection channel when a failure occurs on the working channel are required to prepare and maintain double the bands (bandwidth) or channels that are actually used for the data transmission. In other words, when no failure occurs on the working channel, the protection channel is not used at all, and when a failure occurs on the working channel, the working channel cannot be used. Hence, only 50% of the present bands or channels can be used for the data transmission.

In another conventional ring network, when no failure occurs on the network, a protection channel is used as a transmission channel for extra traffic. In this network, however, when a failure occurs on the network, the extra traffic cannot be protected. In this case, since the protection channel is used as the channel for the working traffic transmission, the channel for sending the extra traffic becomes short. Hence, the extra traffic is forced to be the lower priority traffic than the working traffic.

SUMMARY OF THE INVENTION

It is therefore an object of the present invention to provide a protection system in view of the aforementioned problems of the prior art, which is applied to a ring network having a working channel and a protection channel, and which is capable of transmitting traffic via the working channel and also the protection channel by a virtual concatenation function and LCAS function when no failure occurs on the network, while enabling the transmission of traffic via the untroubled channels even when failure occurs on the network.

It is another object of the present invention to provide a virtual concatenation processing block which is applied to a ring network having a working channel, a protection channel and nodes to exploit bands or channels effectively, and which is capable of transmitting traffic input from an upper layer via the working channel and the protection channel by a virtual concatenation function and LCAS function when no failure occurs on the network and transmitting the traffic via the untroubled channels to protect the traffic by the virtual concatenation function and LCAS function when failure occurs on the network.

It is another object of the present invention to provide a node which is applied to a ring network having a working channel, a protection channel and nodes to exploit bands or channels effectively, and which is capable of transmitting traffic via the working channel and the protection channel by a virtual concatenation function and LCAS function when no failure occurs on the network and transmitting the traffic via the untroubled channels to protect the traffic by the virtual concatenation function and LCAS function when failure occurs on the network.

It is another object of the present invention to provide a ring network having a working channel, a protection channel and nodes to exploit bands or channels effectively and which is capable of transmitting traffic via the working channel and the protection channel by a virtual concatenation function and LCAS function when no failure occurs on the network and transmitting the traffic via the untroubled channels to protect the traffic by the virtual concatenation function and LCAS function when failure occurs on the network.

In accordance with one aspect of the present invention, there is provided a protection system applied to a ring network including a working channel, a protection channel and nodes connected via the working channel and the protection channel, comprising: a non-failure control means for treating the working channel and the protection channel as a continuous band to conduct working traffic transmission using the band when no failure occurs on the network; and, a failure control means for conducting the working traffic transmission using the channels of paths prepared by layer 1 protection process to avoid a troubled part when failure occurs on the network.

In accordance with another aspect of the present invention, there is provided a protection system applied to a ring network including a working channel, a protection channel and nodes connected via the working channel and the protection channel, comprising: a non-failure control means for treating the working channel and the protection channel as a continuous band by LCAS process, and conducting working traffic transmission using the band by virtual concatenation process when no failure occurs on the network; and a failure control means for treating the channels of paths prepared by layer 1 protection process to avoid a troubled part as a band for data transmission by the LCAS process, and conducting the working traffic transmission using the band by the virtual concatenation process when failure occurs on the network.

In another aspect of the present invention, in the protection system of the above aspect, the layer 1 protection process includes ring switch process and span switch process.

In another aspect of the present invention, in the protection system of the above aspect, the virtual concatenation process includes dividing the data input from an upper layer into plural frames as many as virtual containers of the band, applying a mapping process to the frames to prepare mapped frames, transmitting the mapped frames using the different virtual containers, and reproducing the data from the mapped frames input via the virtual containers.

In another aspect of the present invention, in the protection system of the above aspect, the mapping process includes giving the same group identification and individual sequence identifications to the frames prepared from the same data.

In another aspect of the present invention, in the protection system of the above aspect, the sequence identifications of the frames having the same group identification are looked up to reproduce the data.

In accordance with another aspect of the present invention, there is provided a virtual concatenation processing block, which is applied to a ring network including a working channel, a protection channel and nodes connected via the working channel and the protection channel, for connecting a layer 1 function block and a layer 2 function block of each node on the network, comprising: a non-failure control means for treating the working channel and the protection channel as a continuous band to conduct working traffic transmission using the band when no failure occurs on the network; and a failure control means for conducting the working traffic transmission using the channels of paths prepared by layer 1 protection process to avoid a troubled part when failure occurs on the network.

In accordance with another aspect of the present invention, there is provided a virtual concatenation processing block, which is applied to a ring network including a working channel, a protection channel and nodes connected via the working channel and the protection channel, for connecting a layer 1 function block and a layer 2 function block of each node on the network, comprising: a non-failure control means for treating the working channel and the protection channel as a continuous band by LCAS process, and conducting working traffic transmission using the band by virtual concatenation process when no failure occurs on the network; and a failure control means for treating the channels of paths prepared by layer 1 protection process to avoid a troubled part as a band for data transmission by the LCAS process, and conducting the working traffic transmission using the band by the virtual concatenation process when failure occurs on the network.

In another aspect of the present invention, the virtual concatenation processing block of the above aspect further includes: a failure information means for receiving failure information indicating the state of failure occurring in the network and failure recovery information indicating the recovery of the network from the failure and issuing port selection instructions based on the failure information and the failure recovery information; and a connection control means for controlling the connections between the layer 1 function block and the layer 2 function block by controlling its ports based on the port selection instruction supplied from the failure information means.

In another aspect of the present invention, in the virtual concatenation processing block of the above aspect, the layer 1 protection process includes ring switch process and span switch process.

In another aspect of the present invention, in the virtual concatenation processing block of the above aspect, the virtual concatenation process includes dividing the data input from an upper layer into plural frames as many as virtual containers of the band, applying a mapping process to the frames to prepare mapped frames, transmitting the mapped frames using the different virtual containers, and reproducing the data from the mapped frames input via the virtual containers.

In another aspect of the present invention, in the virtual concatenation processing block of the above aspect, the mapping process includes giving the same group identification and individual sequence identifications to the frames prepared from the same data.

In another aspect of the present invention, in the virtual concatenation processing block of the above aspect, the sequence identifications of the frames having the same group identification are looked up to reproduce the data.

In accordance with another aspect of the present invention, there is provided a node comprising: a layer 1 function block; a layer 2 function block; and the virtual concatenation processing block in one of the above aspects, wherein the layer 1 function block and the layer 2 function block are connected via the virtual concatenation processing block, and the layer 1 function block conducts layer 1 protection process.

In another aspect of the present invention, in the node of the above aspect, the layer 1 protection process includes ring switch process and/or span switch process.

In accordance with another aspect of the present invention, there is provided a ring network comprising: a plurality of links of a working channel; a plurality of links of a protection channel; and a plurality of nodes in one of the above aspects connected at a certain interval via the working channel and the protection channel.

BRIEF DESCRIPTION OF THE DRAWINGS

The objects, features and advantages of the present invention will become more apparent from the consideration of the following detailed description, taken in conjunction with the accompanying drawings, in which:

FIG. 6 is a schematic block diagram of the ring network shown in FIG. 5 for explaining a data transmission;

FIG. 8 is a schematic block diagram of the ring network shown in FIG. 6 for explaining a protection system according to a first embodiment of the present invention;

FIG. 10 is a schematic diagram showing a mapping of a frame used in virtual concatenation process on the ring network of the present invention;

FIG. 11 is a schematic block diagram of the ring network of the present invention for explaining the virtual concatenation process;

FIGS. 12(a) and 12(b) are schematic block diagrams showing virtual concatenation process and LCAS process on the ring network of the present invention;

FIG. 13 is a schematic block diagram of another example of the node used in the ring network shown in FIG. 5; and FIG. 14 is a schematic block diagram of the node shown in FIG. 13 for explaining a protection function thereof.

DESCRIPTION OF THE PREFERRED EMBODIMENTS

Figure 1:
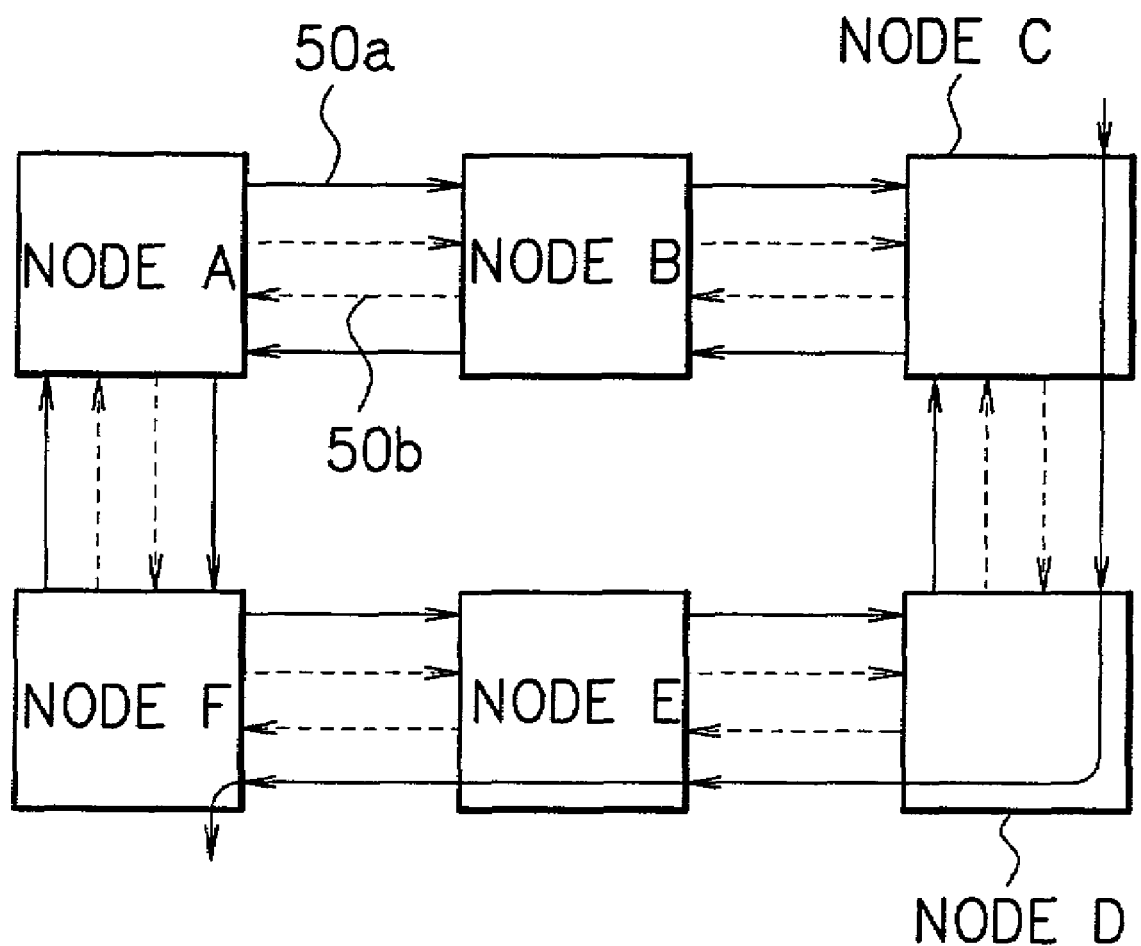
FIG. 1 is a schematic diagram of a conventional BLSR network.
Figure 2:
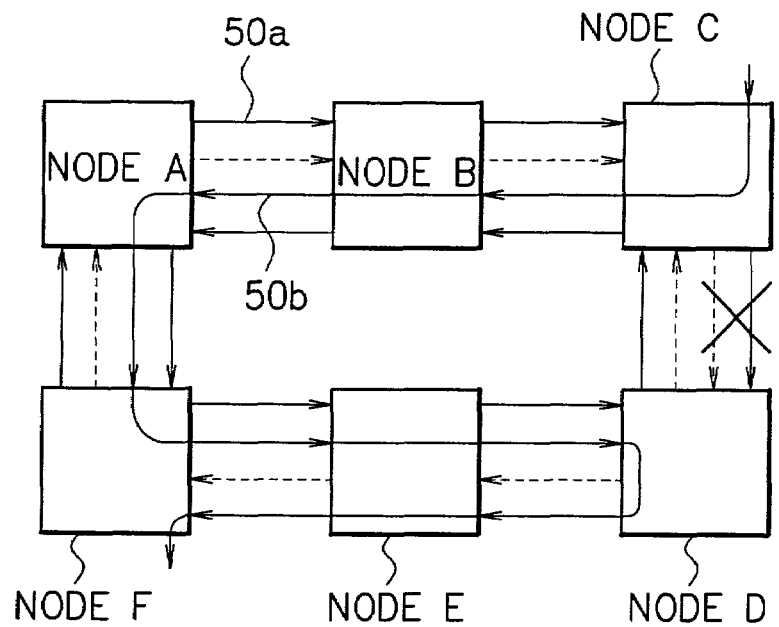
FIG. 2 is a schematic diagram of the conventional BLSR network shown in FIG. 1 for explaining ring switch process.
Figure 3:
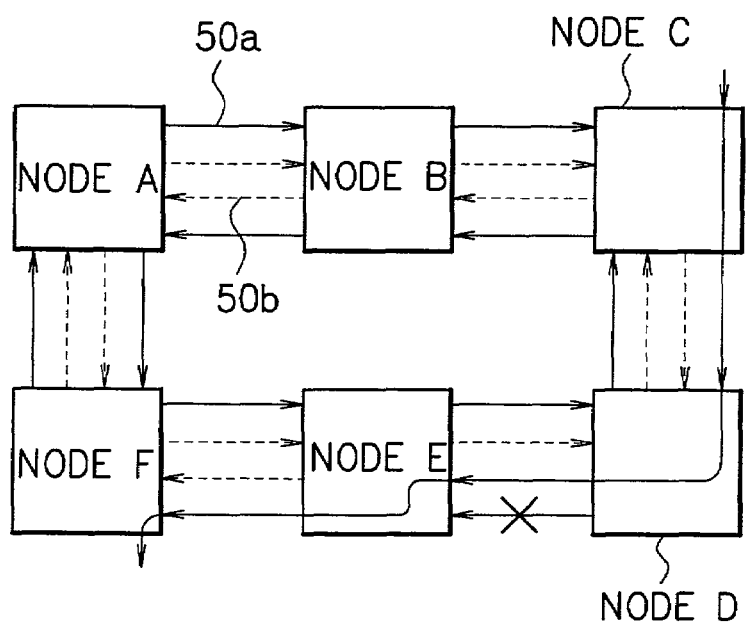
FIG. 3 is a schematic diagram of the conventional BLSR network shown in FIG. 1 for explaining span switch process.
Figure 4:
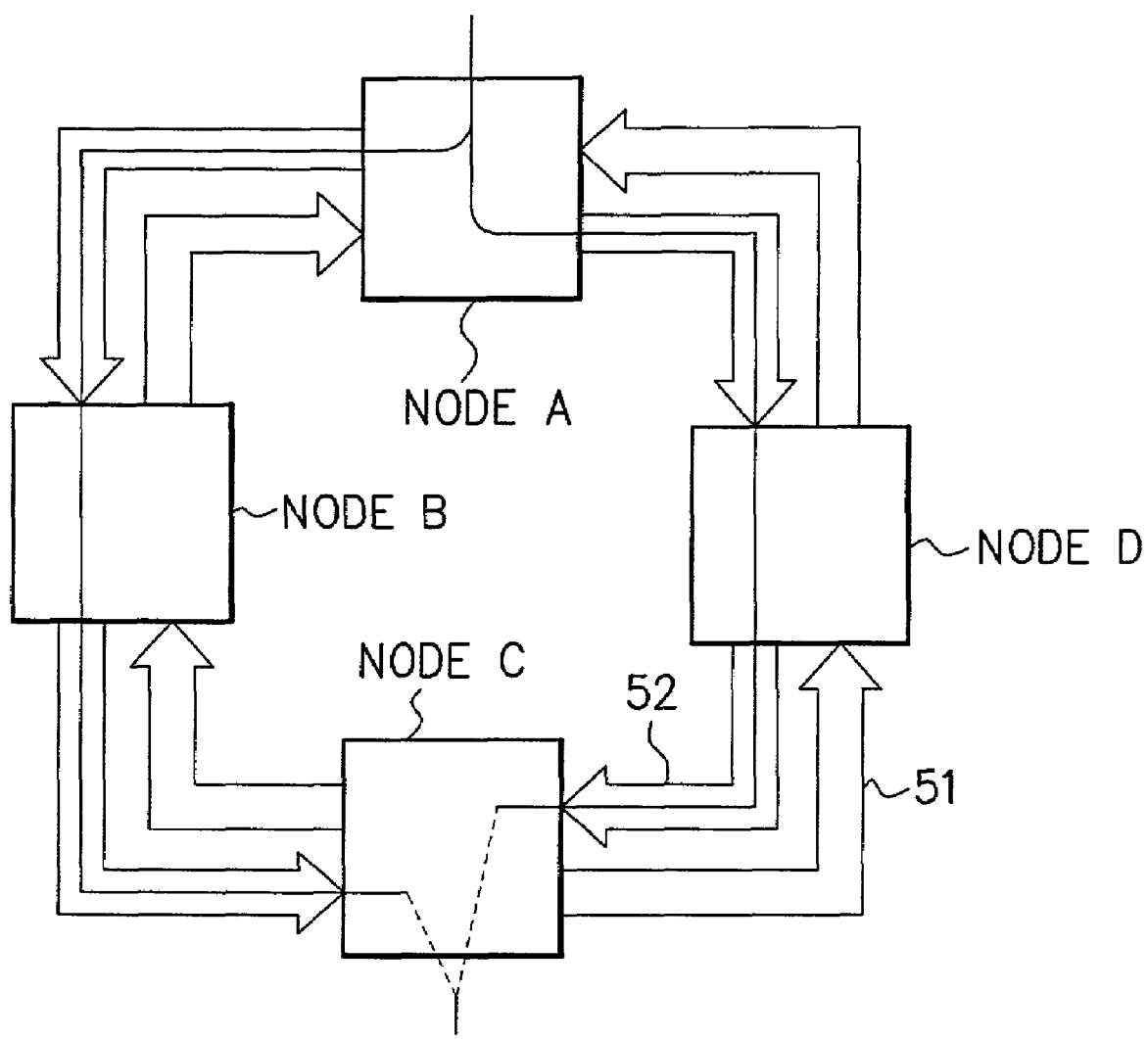
FIG. 4 is a schematic diagram of a conventional UPSR network.

Preferred embodiments of a protection system, a virtual concatenation processing block, a node and the ring network according to the present invention will be described in detail in connection with the accompanying drawings. First, a protection system of the present invention will be described with reference to the drawings.

Protection System

In a protection system of the present invention, link capacity adjustment scheme (LCAS) process is conducted when no failure occurs on the network, and the working channel and the protection channel are treated as a continuous band. Virtual concatenation process is then executed and data is transmitted using these two channels treated as a continuous band. That is, when no failure occurs, the virtual concatenation function and the LCAS function are cooperated to treat the working channel and the protection channel as a continuous band and working traffic is transmitted using the continuous band.

When failure occurs on the network, the LCAS process is conducted to eliminate a troubled channel or band. The virtual concatenation process is then carried out and data is transmitted via the untroubled channels by the LCAS process. That is, the LCAS process is conducted in agreement with the path prepared by layer 1 protection process to reserve channels for data transmission. The working traffic is then transmitted using the reserved data transmission channels by the virtual concatenation process.

The LCAS function or process makes it possible to carry out a dynamic band change of the virtual concatenation. When the band is increased, one or more virtual containers are added to a virtual container group which is treated as a continuous band by the LCAS function or process. On the other hand, when the band is reduced, one or more containers are eliminated from the virtual container group.

The virtual concatenation function or process is to treat the virtual containers (multiplexed unit of SONET/SDH) in plural fibers as a continuous band. That is, the bands of the plural fibers are treated as one band to send one data. In other words, one data item is divided into the number of the fibers treated as one band to produce a plurality of frames and respective frames are transmitted using different fibers. The frames are reassembled using the virtual concatenation function to obtain the original data in a receiving node.

These functions or process can be realized, for example, by adopting the multiplexing systems (functions or processes) and the mapping systems (functions or processes) defined in T1X1.5 and ITU-T.

Next, a virtual concatenation (VC) function block for realizing the protection system, a node and a ring network according to the present invention will be described.

VC Processing Block, Node and Ring Network

A VC processing block of the present invention is arranged between a layer 1 function block and a layer 2 function block of a node in a ring network having a working channel and a protection channel to realize the aforementioned protection system.

When no failure occurs on the network, the LCAS process is conducted to treat the working channel and the protection channel as one continuous band. The virtual concatenation process is then executed to transmit the data using the continuous band.

When a failure occurs on the network, a network or path for avoiding the troubled part is produced by the layer 1 protection process using the LCAS function and the produced path is determined as the channels or bands for the data transmission. The traffic is then passed to the determined channels or bands by the virtual concatenation function.

That is, by using the LCAS function, the VC processing block treats the working channel and the protection channel as a continuous band when no failure occurs on the network. When failure occurs on the network, the VC processing block disconnects the channel unused for the path prepared by the layer 1 protection function and connects to the channel used for the path. That is, by using the virtual concatenation function, working traffic is then passed to the channels prepared by the LCAS function.

Accordingly, when no failure occurs on the network, the working traffic (the traffic to be protected or the high priority traffic) can be passed to the protection channel. In other words, when no failure occurs on the network, the high priority traffic can be sent to the protection channel.

A node of the present invention is applied to a ring network having a working channel and a protection channel. The node includes a VC processing block capable of data transmission using the protection system between the layer 1 function block and the layer 2 function block. The data received from an upper layer (an upper device) is passed to the ring network via the VC processing block to transmit the data to another node coupled with a destination device.

That is, by using the LCAS function, this node treats the working channel and the protection channel as a continuous band when no failure occurs on the network, and eliminates the troubled part (channel) from this band when failure occurs on the network. Then, by using the virtual concatenation function, the data transmission is performed using the band prepared by the LCAS function. Hence, when failure occurs on the network, the traffic passed to the protection channel when no failure occurs can be also protected.

A ring network of the present invention includes a plurality of nodes connected by a link(s) having a working channel(s) and a protection channel(s) at a certain interval in a ring form.

Thus, in the ring network, when no failure occurs, the LCAS process and the virtual concatenation process are carried out to perform the data transmission using not only the working channel but also the protection channel. When failure occurs on the network, by using the LCAS function, the nodes are connected to the path prepared by the layer 1 protection function for avoiding the troubled part to conduct the data transmission using the virtual concatenation function. As a result, the traffic passed to the protection channel when no failure occurs can be protected.

As described above, when no failure occurs on the network, data can be transmitted using double the cannels (bandwidth) as compared with a conventional ring network in which the present channels are divided into the working channel and the protection channel, and data is transmitted using the working channel when no failure occurs. Further, differently from the conventional ring network, the traffic passed to the protection channel when no failure occurs can be also protected.

Figure 5:
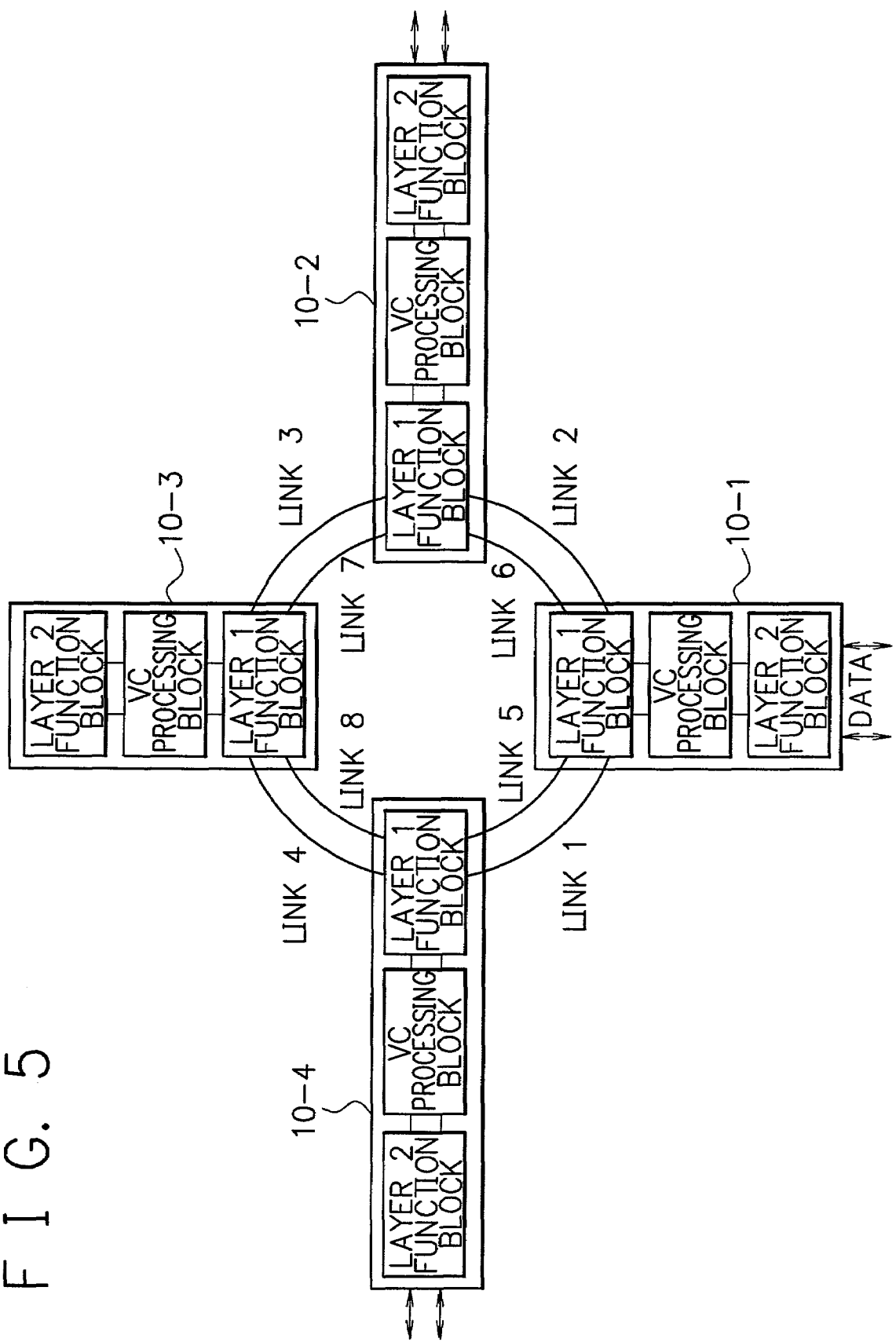
FIG. 5 is a schematic block diagram of a ring network according to a first embodiment of the present invention.

In FIGS. 5 and 6, there is shown a ring network of the present invention, including four nodes connected by links at a certain interval in a ring form. The four nodes 10-1 to 10-4 and eight links 1 to 8 constitute the network. As shown in FIGS. 5 and 6, the link 1 couples the nodes 10-4 and 10-1, the link 2 the nodes 10-1 and 10-2, the link 3 the nodes 10-2 and 10-3, and the link 4 the nodes 10-3 and 10-4. Similarly, the link 5 couples the nodes 10-4 and 10-1, the link 6 the nodes 10-1 and 10-2, the link 7 the nodes 10-2 and 10-3, and the link 8 the nodes 10-3 and 10-4.

The ring network of this kind includes a 2-fiber ring network and a 4-fiber ring network. Each network includes four channels: two working channels and two protection channels, connecting the nodes at the certain interval. In the 2-fiber ring network, two adjacent nodes are connected by two optical fibers and the capacity of each optical fiber is divided into two parts: one for the working channel and the other for the protection channel. That is, in FIG. 5, each link may be composed of one optical fiber including the working channel and the protection channel. In the 4-fiber ring network, two adjacent nodes are coupled by four optical fibers: two for the working channels and two for the protection channels. Each link shown in FIG. 5 may be composed of two optical fibers (bidirectional lines).

A preferred embodiments of the ring network shown in FIGS. 5 and 6 according to the present invention will be described, and in addition, a protection system, a layer 2 function block and a node of the present invention will be also described in detail.

First Embodiment

Figure 7:
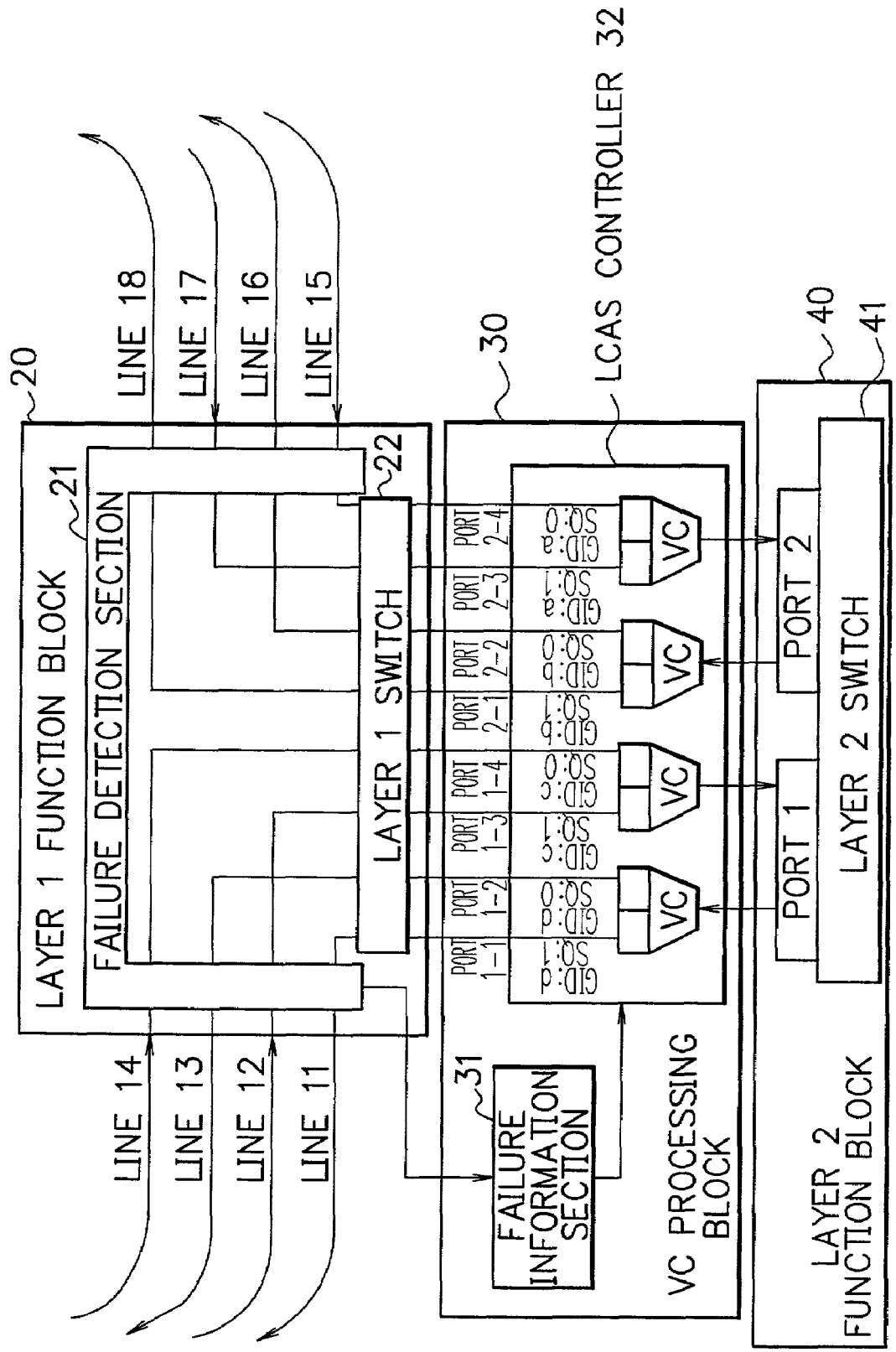
FIG. 7 is a schematic block diagram of an example of a node used in the ring network shown in FIG. 5.

A ring network in accordance with the first embodiment of the present invention employs the 4-fiber ring, in which the links 1 to 4 shown in FIG. 5 are working channels and the links 5 to 8 are protection channels. BLSR is adopted as the layer 1 protection function. Node:

FIG. 7 illustrates an example of the composition of the node 10 (10-1) in the ring network of the first embodiment. In FIG. 7, the node 10 includes a layer 1 function block (ring device) 20, a virtual concatenation (VC) processing block 30 and a layer 2 function block 40. In the case of the node 10-1 shown in FIG. 5, the link 1 correspond to the lines (channels) 11 and 12, the link 2 to the lines 15 and 16, the link 5 to the lines 13 and 14, and the link 6 to the lines 17 and 18. That is, the lines 11, 12, 15 and 16 are the working channels, and the lines 13, 14, 17 and 18 are the protection channels.

Layer 1 Function Block

As shown in FIG. 8, the layer 1 function block 20 connects four SONET/SDH links (transmission lines or optical fibers) to the VC processing block 30, and inputs the data from the VC processing block 30 via a layer 1 switch 22 to pass the data to a prescribed link. That is, the layer 1 function block 20 has a layer 1 function of the OSI 7-layer model (OSI reference model). The layer 1 function block 20 further includes a failure detection section 21 and possesses a ring protection function of a layer 1 level (layer 1 protection function).

This layer 1 protection function is a function for producing a network (path) to avoid a part where a failure is detected (a troubled part, line or link) when the failure detection section 21 detects a failure on the network, and BLSR is adopted for the layer 1 protection function in this embodiment. Incidentally, the layer 1 protection function is different from the protection function of the present invention, that is, the protection function of the VC processing block 30. Therefore, according to the present invention, the "protection function or process" does not include the "layer 1 protection function or process".

The failure detection section 21 detects a failure on the lines 11 to 18. When detecting a failure, the failure detection section 21 sends failure information to the layer 1 switch 22 and a failure information section 31 of the VC processing block 30. On the other hand, when detecting a recovery of the line from the failure, the failure detection section 21 informs the layer 1 switch 22 and the failure information section 31 of the VC processing block 30 about the failure recovery. In this embodiment, a conventional detection method of failure or failure recovery can be used.

The layer 1 switch 22 conducts layer 1 ring protection process when the failure detection section 21 detects a failure on the network.

In this embodiment, since BLSR is employed, when a failure occurs on a link between adjacent two nodes and at least both the working channel and the protection channel in one data transmission direction between the two nodes cannot be used, the layer 1 switch 22 carries out the "ring switch process". That is, when a failure occurs on both the working channel and the protection channel for transmitting the data in one direction between two nodes, the layer 1 switch 22 executes "turn-back process" to avoid the troubled part (line, channel or link) and builds a path for avoiding the troubled part. More specifically, when a failure occurs in a line on one side of a node, the layer 1 switch 22 of the node connects the inputting working channel to the outputting protection channel on the other side.

When data cannot be transmitted in both directions between two nodes, the layer 1 switch 22 also conducts the ring switch process to avoid the troubled part or line.

Further, when a failure occurs on a link between two nodes and at least one of the working channel and the protection channel in each data transmission direction can be used, the layer 1 switch 22 executes the "span switch process". That is, if at least one of the working channel and the protection channel in each of the two data transmission directions between two nodes can be used, the layer 1 switch 22 closes the troubled channel, and thus only the untroubled channel of the same data transmission direction as that of the troubled channel is used. In other words, a just upper node in the data transmission direction of the troubled channel transmits data using the other channel of the same data transmission direction as that of the troubled channel. A just lower node in the data transmission direction of the troubled channel receives the data via the untroubled channel.

Incidentally, according to the present invention, the layer 1 switch may conduct the ring switch process even when the troubled part can be avoided by the span switch process.

When lines from the node 10-1 to the node 10-4 are totally broken (failure on the lines 11 and 13) or lines from the node 10-4 to the node 10-1 are totally broken (failure on the lines 12 and 14), the nodes 10-1 and 10-4 carry out the ring switch process.

The nodes 10-1 and 10-4 can not use the lines 11 and 13 shown in FIG. 7, therefore, the port 40-1 of the layer 2 switch 41 is connected to the line 18 and data output from the port 40-1 is transmitted on the line 18. If the nodes 10-1 and 10-4 cannot use the lines 12 and 14 shown in FIG. 7, data to be supplied to the port 40-1 of the layer 2 switch 41 is received from the line 17 and input to the port 40-1. Thereby, a network (path/route) avoiding the failure point by means of the ring switch process is established as shown in FIG. 8.

If at least one channel for transmitting data from the node 10-1 to the node 10-4 and at least one channel for transmitting data from the node 10-4 to the node 10-1 can be used, both the nodes 10-1 and 10-4 conduct the span switch process.

It is assumed that the node 10-1 can use at least one of the lines (channels) 11 and 13 for transmitting data to the node 10-4 and at least one of the lines (channels) 12 and 14 for receiving data from the node 10-4. When failure occurs on the line (channel) 11 for transmitting data to the node 10-4, the node 10-1 carries out the data transmission to the node 10-4 using the line 13 of the same data transmission direction as that of the troubled line 11.

The node 10-4 is set up to receive data from the node 10-1 using the untroubled line 13.

VC Processing Block

The VC processing block 30 includes the failure information section 31 and an LCAS controller 32, and realizes the aforementioned protection function (the virtual concatenation function and the LCAS function).

The failure information section 31 outputs a port selection instruction to the LCAS controller 32 on the basis of the failure information or the failure recovery information sent from the failure detection section 21.

The LCAS controller 32 includes eight ports 32-1-1 to 31-1-4 and 32-2-1 to 32-2-4 connected to the layer 1 switch 22 of the layer 1 function block 20 and conducts the LCAS process according to the port selection instruction sent from the failure information section 31.

When no failure occurs on the network, the LCAS controller 32 treats the working channel and the protection channel as a continuous band by the LCAS function, and executes the data transmission by the virtual concatenation function using the band treated as a continuous band by the LCAS function. When failure occurs on the network, the LCAS controller 32 eliminates the band excluded from the path produced by the layer 1 protection process of the layer 1 switch 22.

The LCAS controller 32 can obtain information on the type of the path produced by the layer 1 protection function (a path produced by the ring switch process or the path produced by the span switch process/a link (path) set up for data transmission or reception, etc.), for example, from the layer 1 switch 22. In the case where the type of the path to be produced is predetermined for each failure information indicating the state of the failure, having received the failure information sent from the failure information section 31, the LCAS controller 32 may determine the type of the produced path on the basis of the failure information and the settings. The settings include the following examples.

(1) The span switch process is conducted when the troubled part can be avoided by the span switch process. The ring switch process is conducted when the troubled part cannot be avoided by the span switch process.

(2) The ring switch process (turn-back process) is conducted regardless of the state of the failure when failure occurs on a link.

(3) In addition to the setting (1), when the span switch process is conducted on channels of one data transmission direction between two nodes, the span switch process is executed on channels of the other data transmission direction between the same nodes.

(4) In addition to the setting (1) or (3), where the span switch process is executed on lines (working channel and protection channel) of one data transmission direction, the span switch process is conducted on other lines (working channel and protection channel) of the same data transmission direction. That is, the data transmission in the data transmission direction is carried out using only the working channel or the protection channel between other nodes than the nodes adjacent to the troubled part (channel).

(5) In addition to the setting (4), the data transmission is executed using only the working channel or the protection channel in the other data transmission direction.

The LCAS function and the virtual concatenation function of the LCAS controller 32 will be described in detail.

LCAS Function

In FIG. 8, when no failure occurs, the LCAS controller 32 of the node 10-1 connects the ports 32-1-1 to 32-1-4 and 32-2-1 to 32-2-4 coupled with the lines (channels) of the layer 1 to ports 40-1 and 40-2 of a layer 2 switch 41 which are coupled with an upper layer (upper device), respectively, so that the working traffic can be transmitted using the protection channel as well as the working channel.

More specifically, the port 40-1 of the layer 2 switch 41 is coupled with the ports 32-1-1 and 32-1-2 (lines 11 and 13) of the LCAS controller 32 in order to transmit the data input from the port 40-1 in the clockwise direction in FIG. 5. The lines 11 and 13, namely, the working channel and the protection channel of the clockwise data transmission direction are treated as a continuous band by the LCAS function.

Similarly, the ports 32-1-3 and 32-1-4 connected to the lines 12 and 14 are coupled with the port 40-1 in order to input the data to the node 10-1 from the links in the counterclockwise data transmission direction in FIG. 5. The line 12 (working channel) and the line 14 (protection channel) are treated as a continuous band by the LCAS function.

The port 40-2 of the layer 2 switch 41 is coupled with the ports 32-2-1 and 32-2-2 (lines 18 and 16) in order to pass the traffic to the links in the counterclockwise data transmission direction in FIG. 5. The lines 16 and 18 are treated as a continuous band by the LCAS function.

The ports 32-2-3 and 32-2-4 connected to the lines 17 and 15 are coupled with the port 40-2 connected to the upper layer in order to receive the traffic from the links in the clockwise data transmission direction in FIG. 5. The lines 15 and 17 are treated as a continuous band by the LCAS function.

When No Failure Occurs

The LCAS controller 32 connects the paths or channels built by the layer 1 switch 22 using the layer 1 protection function to the upper layer device when no failure occurs. In order to transmit data using the channels, the channels are determined as the band for conducting. the data transmission by the LCAS function. That is, the channels for conducting the data transmission are connected to the upper layer in the layer 1 protection process. Further, the band unable to be used at the troubled time is eliminated from the band for executing the data transmission at the untroubled time and/or the band unused at the untroubled time is added to the band for executing the data transmission.

When Failure Occurs 1

The case illustrated in FIG. 8 is taken as an example. In FIG. 8, both the working channel and the protection channel in at least one data transmission direction between the nodes 10-1 and 10-4 are totally disabled.

In this case, the layer 1 switches 22 of the nodes 10-1 and 10-4 conduct the ring switch process so as to avoid the troubled part or links. More specifically, the layer 1 switch 22 of the node 10-1 connects the port 32-1-1 of the LCAS controller 32 to the protection channel (line 18) outputting data to the node 10-2, and connects the port 32-1-3 to the protection channel (line 17) inputting data from the node 10-2. Thus, as shown in FIG. 8, data transmission between the nodes 10-4 and 10-3, between the nodes 10-3 and 10-2 and between the nodes 10-2 and 10-1 is carried out bidirectionally by use of the working channels (links 2, 3 and 4). Data transmission between the nodes 10-1 and 10-4 is carried out bidirectionally by use of the protection channels (links 6,7 and 8).

Figure 9:
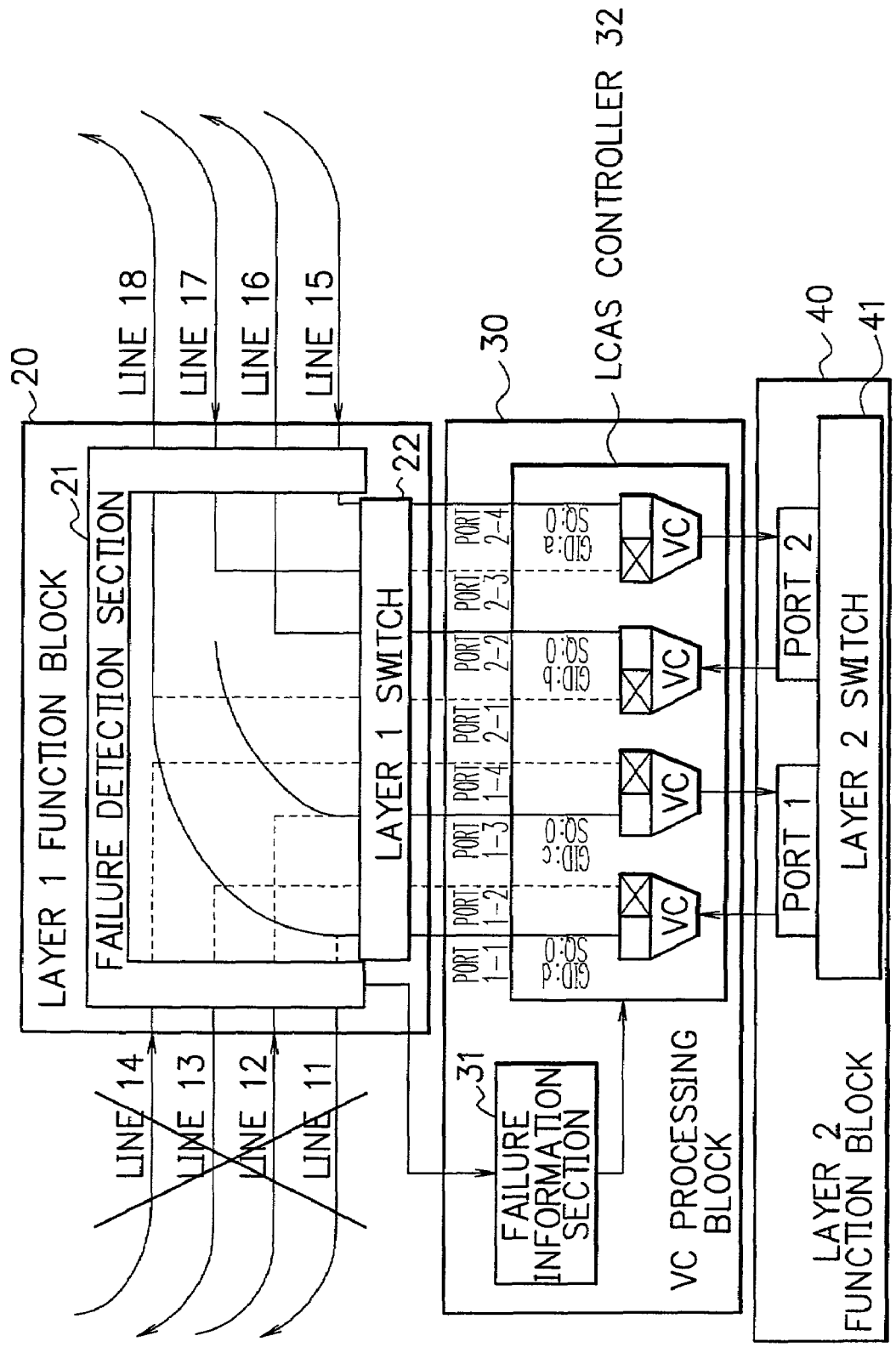
FIG. 9 is a schematic block diagram of the node shown in FIG. 7 for explaining a protection function thereof.

Hence, when the node 10-1 conducts the data communication with the node 10-2, the link 2 is used. That is, as shown in FIG. 9, in the node 10-1, the LCAS controller 32 couples the upper layer (port 40-2) with the line 15 (port 32-2-4) in order to receive data from the node 10-2 to the node 10-1. The LCAS process is then carried out to the band of the line 15. Similarly the LCAS controller 32 couples the line 16 (port 32-2-2) for the data transmission to the node 10-2 with the upper layer (port 40-2) and the LCAS process is performed on this channel.

In the same manner, the port 40-1 and the line 17 (port 32-1-3) are coupled in order to receive data from the node 10-4 to the node 10-1 and the LCAS process is conducted on the line 17. The line 18 (port 32-1-1) for the data transmission to the node 10-4 and the port 40-1 are connected and the LCAS process is conducted on this channel to make it possible to transmit the data via the channel.

The node 10-4 also carries out the ring switch process in the same manner as the node 10-1. Hence, in the node 10-4, the LCAS controller 32 connects the predetermined paths (lines or channels) used in the ring switch process to the upper layer in the same manner as the LCAS controller 32 of the node 10-1. The LCAS process is conducted on the channels. In the other nodes 10-2 and 10-3, when the ring network is operated by the paths prepared by the ring switch process, the paths used for the data transmission or reception are set for each node. Hence, the LCAS controller 32 of each node connects to the specific paths selected from the paths prepared by the layer 1 protection process and conducts the LCAS process at the usabale band.

That is, the LCAS controller 32 executes the LCAS process at troubled time and eliminates unused channels in the layer 1 protection process from the channels used at untroubled time. The LCAS controller 32 also adds the channels which are unused at the untroubled time but used during the layer 1 protection process to the used channels.

When Failure Occurs 2

For example, a failure occurs on the working channel (line 11 in FIG. 7) of the data transmission direction from the node10-1 to the node 10-4. In this case, the layer 1 switches 22 of the nodes 10-1 and 10-4 conduct the layer 1 protection process (for example, the span switch process or the turn-back process such as the ring switch process for avoiding the troubled part (link)).

In the node 10-1, the layer 1 switch 22 connects the port 40-1 of the layer 2 switch 41 coupled to the upper layer with the port 32-1-2 of the LCAS controller 32 coupled to the line 13 -so that the data transmission to the node 10-4 is carried out using only the protection channel (line 13) of the same data transmission direction as that of the working channel (line 11). That is, the LCAS process is conducted to perform the data transmission using the line 13.

In the node 10-4, the layer 1 switch 22 executes the LCAS process to receive the data sent from the node 10-1 to the node 10-4 via the protection channel (line 13).

That is, the LCAS controller 32 carries out the data transmission using the working channel and the protection channel by the LCAS process when no failure occurs, and conducts the data transmission using the paths built by the layer 1 switch 22 using the layer 1 protection function when failure occurs.

Incidentally, in other links where no span switch process is executed, data transmission can be conducted by means of the link aggregate process. It is also possible to carry out the span switch process in other links having no failure (the aforementioned settings (3), (4), (5), etc.). In this case, the LCAS controller 32 of each node connects to the paths built by the span switch process to carry out the data transmission or reception.

As described above, even when the troubled part (line) can be avoided by the span switch process, the layer 1 switch 22 of the node adjacent to the troubled line may conduct the turn-back process (ring switch process). In this case, the LCAS controller 32 of each node operates as with the case of carrying out the ring switch process to execute the data transmission.

Virtual Concatenation Function

The LCAS controller 32 sets the band for the data transmission by the LCAS function and conducts the data transmission using the band by the virtual concatenation function. Known methods can be used as the data transmission method using the virtual concatenation function, for example, the following data transmission method can be employed.

For example, it is assumed that the node 10-1 communicates the data with the node 10-4. When no failure occurs, the LCAS controller 32 in the node 10-1 treats the line 11 (working channel) and the line 13 (protection channel) as a continuous band by the LCAS function.

More specifically, each channel has a path (STS-1 path) with respect to each frame (STS-1: synchronous transport signal-1) for conducting traffic transfer. Thus, the LCAS controller 32 treats an STS-1 path of the working channel and an STS-1 path of the protection channel as a continuous band by the LCAS process to employ these paths for the data transmission.

When outputting the data received from the layer 2 switch 41 to the links (lines 11 and 13 in FIG. 7) in the clockwise direction in FIG. 5, the LCAS controller 32 divides the data into frames as many as usable paths for the data transmission to a destination node. In this example, the data is divided into two frames.

The LCAS controller 32 then applies a mapping process to the frames. In the mapping process, a group ID and sequence ID are assigned to each frame and are written in a POH (path over head) of each frame. The group ID is the ID corresponding to the original data. The sequence ID represents the order of each divided data (frame). That is, the frames with the same group ID are the frames prepared by dividing the same data. The sequence IDs show the alignment orders of the frames constituting the same data. By referring to the sequence IDs, the original data (data input from the layer 2 switch 41) is reassembled by the LCAS controller 32 of the node which received the frames.

Respective frames are mapped, as shown in FIG. 10, and are thereafter output from different STS-1 paths to the destination node 10-4, as shown in FIG. 11.

Thus, a plurality of ports for inputting or outputting frames having the same group ID can be logically treated as one large capacity port.

For instance, as shown in FIG. 12(a), when data STS-1Xv input from the upper layer is transmitted via three STS-1 paths, the data STS-1Xv is divided into three frames as shown in FIG. 12(b). The three frames are attached with the same group ID and the sequence IDs (SQ0, SQ1 and SQ2) in the data order in the data STS-1Xv. The frames are sent to the destination node via the different STS-1 paths, as shown in FIG. 12(a).

The node 10-4 as the destination node receives the frames and reassembles the frames into the original data on the basis of the group ID and the sequence IDs of the frames. In this case, as shown in FIG. 12(b), the frame with the sequence ID SQ1 and the frame with the sequence ID SQ2 are added to the frame with the sequence ID SQ0 in succession to reproduce the original data STS-1Xv.

The sequence ID can be contained in the POH (path over head) H4 bytes of a basic frame structure STS-1/3c of the SONET/SDH or the POH Z7 or K4 bytes of the VT1.5/2/3/6. FIG. 10 shows the structure of the frames.

In the LCAS protocol, the group ID, the LCAS control words and the like are defined. The same group ID is attached to the data included in the same virtual concatenation. The LCAS control words are used for giving control messages to nodes for operating the virtual concatenation. That is, the LCAS control words are data to make it possible to add/eliminate the dynamic band of the virtual concatenation.

Layer 2 Function Block

The layer 2 function block 40 includes the layer 2 switch 41 and executes the layer 2 process of the OSI 7-layer model. The layer 2 function block 40 further includes an interface for connecting to an external terminal and a plurality of ports (ports 40-1 and 40-2 in this embodiment) to couple with the VC processing block 30. That is, the layer 2 function block 40 connects to the links via the VC processing block 30 to realize the communication between an external terminal and a terminal connected to another node.

Next, examples of ring network control according to the preferred embodiment of the present invention at the untroubled time and the troubled time will be described.

Ring Network Control: at Untroubled Time

Each node 10 treats the working channel and the protection channel of the same data transmission direction as a continuous band by the LCAS function and conducts the transmission and reception of working traffic via the band using the virtual concatenation function.

For example, in FIG. 7, the node 10-1 treats the line 11 (working channel) and the line 13 (protection channel) as a continuous band by the LCAS process. The node 10-1 then conducts the data transmission to the node 10-4 using the band by the virtual concatenation function. Further, the node 10-1 treats the line 12 (working channel) and the line 14 (protection channel) as a continuous band by the LCAS process, and reproduces original data from the frames sent via the band by the virtual concatenation function.

The node 10-1 treats the line 11 (working channel) and the line 13 (protection channel) as a continuous band by the LCAS function. The node 10-1 divides data into two frames and sends the two frames to the destination node 10-4 via the two different channels.

The node 10-4 receives the two frames sent from the node 10-1 via the working channel and the protection channel, and reproduces the original data from the received two frames.

For instance, when sending data to the node 10-4, the LCAS controller 32 of the node 10-1 employs the line 11 of the link 1 and the line 13 of the link 5, and conducts the LCAS process on each line to consider the lines 11 and 13 to be a continuous band.

The node 10-1 inputs data from the node 10-4 via the line 12 of the link 1 and the line 14 of the link 5. In the node 10-1, the output from the port 40-1 of the layer 2 switch 41 is connected to the lines 11 and 13 (ports 32-1-1 and 32-1-2). Similarly, the port 40-1 is coupled with the ports 32-1-3 and 32-1-4.

The LCAS controller 32 carries out the virtual concatenation process when transmitting and receiving data. For example, when the node 10-1 transmits data (traffic) to the node 10-4, the data input from the port 40-1 of the layer 2 switch 41 is divided into two SONET/SDH frames. The mapping process is applied to each frame. For example, each frame is given the same group ID (GID) "b" and the sequence IDs (SQ0 and SQ1), "0" being assigned to the frame including the front half of the data and "1" to the frame including the rear half of the data. The two frames are transmitted to the node 10-4 via the different lines 11 and 3. In this case, the node on the receiving side arranges the frames having the same GID "b" in order of the numbers attached to SQ and combines the frames to reproduce the original data.

The LCAS controller 32 does not let the upper layer (layers 3 to 7 of the OSI 7-layer model) be aware that the number of the ports for transmission and the number of the ports for reception are both plural (ports 32-1-1 to 32-1-4 and 32-2-1 to 32-2-4). That is, the virtual concatenation is set so that one logic port used for the data transmission to the node 10-4 is placed for the upper layer.

The upper layer sends data to be transmitted to the node 10-4 to the logic port of the LCAS controller 32. The LCAS controller 32 divides the received data into frames as many as the ports (two ports 32-1-1 and 32-1-2 in this embodiment), that is, the number of channels used for the data transmission to the node 10-4. In this example, two frames are produced. The mapping process is applied to the produced frames and the mapped frames are sent to the node 10-4 using the two ports 32-1-1 and 32-1-2.

On the other hand, the frames input via the lines 15 and 17 are input to the ports 32-2-4 and 32-2-3 of the LCAS controller 32. The LCAS controller 32 reproduces data from the received frames on the basis of the IDs such as GID and SQ attached to the frames. The reproduced data is input to the port 40-2 of the layer 2 switch 41.

Ring Network Control: at Troubled Time 1

First, a control of the ring network for conducting the ring switch process to avoid the links 1 and 5 will be described.

The adjacent nodes 10-1 and 10-4 adjacent to the links 1 and 5 connect the working channels and the protection channels so as to avoid the troubled parts (links 1 and 5). That is, the node 10-1 is connected to the node 10-4 using the links 6 to 8 (protection channel).

The nodes 10-2 and 10-3 set the prescribed channels used during the ring switch process using the LCAS function, and conduct the data transmission using the channels by the virtual concatenation function. The node 10-1 and/or the node 10-4 may inform the other nodes 10-2 and 10-3 about conducting the ring switch process.

The operation of the node 10-1 will be described in detail. In the node 10-1, when the failure detection section 21 detects the failures on the lines 11 to 14 (links 1 and 5), the failure detection section 21 informs the layer 1 switch 22 and the failure information section 31 of the layer 2 function block 30 about the state of the failure (failure information).

The layer 1 switch 22 determines what type of layer 1 protection process is performed (what type of network is built) on the basis of the failure information. The type of layer 1 protection process (ring switch process, span switch process, etc.) to be employed may be, as described above, determined in advance for each failure information. Further, negotiations with the other node 10-4 adjacent to the troubled part may be carried out as to the type of layer 1 protection process to be conducted. The failure detection section 21 may make this determination. The determined layer 1 protection process is then executed. The ring switch process is performed in this example, and the turn-back process is conducted using the lines 15 to 18 to avoid the troubled parts (lines 11 to 14). That is, the port 32-1-1 of the LCAS controller 32 is connected to the protection channel (line 18) of the output transmission direction, and the port 32-1-3 is connected to the protection channel (line 17) of the input transmission direction.

When receiving the failure information, the failure information section 31 permits the LCAS controller 32 to conduct the data transmission using the band used for the ring switch process (port selection instruction). The failure information section 31 may inform the other nodes 10-2 and 10-3 of the execution of the ring switch process.

The LCAS controller 32 couples the ports 40-1 and 40-2 of the layer 2 switch 41 with the ports 32-1-1 to 32-1-4 and 32-2-1 to 32-2-4 (lines) to be used after the ring protection.

In this example, during the protection process, the node 10-1 carries out the communication with the node 10-2 using the link 2 (lines 15 and 16) and the node 10-4 using the link 6 (lines 17 and 18).

Hence, the LCAS controller 32 connects the port 40-1 for outputting the data to the node 10-4 to the line 18 (port 32-1-1) for the data transmission to the node 10-4. The LCAS controller 32 disconnects the unusable line 13 (port 32-1-2). Similarly, the LCAS controller 32 couples the port 40-1 and the line 17 (port 32-1-3) to make it possible to receive the data from the node 10-4, and disconnects the unusable line 14 (port 32-1-4).

The LCAS controller 32 also disconnects the connection between the line 18 (port 32-2-1) and the port 40-2 since the line 18 is connected to the port 40-1 to use for the data transmission to the node 10-4, and similarly, disconnects the connection between the port 40-2 and the line 17 (port 32-2-3).

After the aforementioned settings, the LCAS controller 32 executes the data transmission at the band used in the ring switch process by the virtual concatenation function. The data transmission by the virtual concatenation function may be carried out in the same manner as described above for the untroubled time.

The node 10-4 (the other node adjacent to the troubled links) conducts the turn-back process (ring switch process) to avoid the troubled links like the node 10-1. The VC processing block 30, as with in the node 10-1, connects to the lines used for the data transmission during the operation of the ring switch process, and conducts the LCAS process on the lines. The VC processing block 30 also carries out the data transmission using the band, which becomes usable by the LCAS function, by the virtual concatenation function.

Similarly, the nodes 10-2 and 10-3 connect to the lines used for the data transmission during the operation of the ring switch process, and conduct the LCAS process on the lines. The data transmission is then carried out using the band, which becomes usable by the LCAS function, by the virtual concatenation function. Whether or not the layer 1 protection process is conducted can be determined by known methods. For example, as described above, when the layer 1 protection process is executed, the failure information section 31 of the node 10-1 and/or the node 10-4 adjacent to the troubled links may send this information to other nodes 10-2 and 10-3.

When the network is restored from failure, the node 10 operates in the same manner as described above for the operation at the untroubled time.

More specifically, when detecting the recovery of the network, the failure detection section 21 informs the failure information section 31 of the recovery. The failure information section 31 instructs the LCAS controller 32 to add the band (port selection instruction). The LCAS controller 32 carries out the virtual concatenation process as above described and conducts the data transmission and reception using the two links.

Ring Network Control: at Troubled Time 2

The control of the ring network in the case of executing the span switch process on the link 1 in FIG. 5 will be described.

In this case, when a failure occurs on the link 1 and the troubled part is avoided by the span switch process, each of the failure detection sections 21 of the nodes 10-1 and 10-4 adjacent to the troubled part sends the failure information to the layer 1 switch 22 and the failure information section 31. The layer 1 switch 22 produces a path using an untroubled channel (line). That is, when a failure occurs on the working channel, a path using the protection channel is produced, and when a failure occurs on the protection channel, a path using the working channel is produced.

The failure information section 31 permits the LCAS controller 32 to execute the LCAS control for excluding the band of the troubled line. That is, the LCAS controller 32 treats only the untroubled lines as the band for the data transmission and transmits data using the band by the virtual concatenation function.

In the case where the aforementioned settings (for executing the span switch process not only for the failure link but also for other links) have been made, the span switch process is also executed for the links. Namely, the LCAS controller 32 of each node carries out the data transmission using one of the two channels (lines). The channel to be used may be previously set or may be determined by negotiations between the LCAS controllers 32 of the two nodes directly connected to the troubled link.

As described above, the ring network of the present invention can transmit working traffic utilizing the protection channel as well as the working channel when no failure occurs on the network, and conduct the protection of the working traffic in cooperation with the LCAS function when failure occurs on the network.

Further, at the layer 1 level of the ring network, it is unnecessary to be conscious of the LCAS function (virtual concatenation function/protection process) conducted by the VC processing block. That is, the layer 1 level (layer 1 function block and links) is required only to carry out the layer 1 process (including the layer 1 protection process) as in the conventional network. Hence, the ring network of the first embodiment can be implemented only by employing the layer 2 function blocks 30 in nodes of the conventional ring network.

Second Embodiment

While BLSR is employed in the ring network of the first embodiment, UPSR can also be employed as the layer 1 protection function in the ring network in accordance with the present invention.

In this embodiment, for example, the links 1 and 5 in FIG. 5 are used as the working channel and the links 2, 3, 4, 6, 7 and 8 are used as the protection channel.

As shown in FIG. 13, when no failure occurs on the network, the LCAS controller 32 treats channels corresponding to the ports 32-1-1 and 32-1-3 as a continuous band by the LCAS process and conducts the data transmission using the band by the virtual concatenation process. The LCAS controller 32 treats the line 14 (ports 32-1-2) and line 13 (32-1-4) as a continuous band by the LCAS process. In this embodiment, when a failure occurs on the network, the lines 14 and 13 can be used and the ports 32-1-1 and 32-1-2 are selected as shown in FIG. 14. The LCAS controller 32 controls the channels to conduct the data communication using the selected lines by the LCAS protocol.

In other words, when no failure occurs on the network, the LCAS controller 32 on the data transmitting side treats the working channel and the protection channel as a continuous band by the LCAS function in the same manner as described above for the first embodiment, and executes the data transmission using the band (virtual concatenation function). When failure occurs on the network, the LCAS controller 32 sets an untroubled channel (path) as the band for the data transmission (LCAS function), and conducts the data transmission using this band (virtual concatenation function).

When no failure occurs on the network, the layer 1 function block 20 on the data receiving side receives the data from the working channel and the protection channel. The LCAS controller 32 treats the working channel and the protection channel as a continuous band by the LCAS function, and reproduces original data from frames input from the working channel and the protection channel (virtual concatenation function). When failure occurs on the network, the LCAS controller 32 sets a untroubled channel (path) as the band for receiving data by the LCAS function, and reproduces original data from frames input via the band by the virtual concatenation function.

When the data transmission is performed between the nodes 10-1 and 10-4, when no failure occurs on the network, the node 10-1 transmits data using the working channel and the protection channel for the data transmission to the node 10-4 (LCAS function and virtual concatenation function). When failure occurs on the network, the node 10-1 executes the data transmission by selecting an untroubled channel (path) from the working channel and the protection channel for the data transmission to the node 10-4. That is, the troubled channel (path) is eliminated by the LCAS function to prepare the band for the data transmission and the data transmission is carried out using the virtual concatenation function.

When no failure occurs on the network, the node 10-4 reproduces data from frames input from the working channel and the protection channel (LCAS function and the virtual concatenation function). That is, the node 10-4 receives the data (frames) from both the working channel and the protection channel. When failure occurs on the network, the node 10-4 sets an untroubled channel (path) selected from the channels (path) for the data reception from the node 10-1 as the band for the data reception (LCAS function), and reproduces original data from received frames using the virtual concatenation function.

Third Embodiment

Although the 4-fiber ring is used in the ring network according to the first embodiment of the present invention, the present invention can also be applied to 2-fiber ring. The third embodiment of the present invention implements the first embodiment by the 2-fiber ring. In this case, each of the links shown in FIG. 5 is constructed by one fiber (cable). Hence, in FIG. 7, the lines 11 and 13 correspond to the link 1 in FIG. 5, the lines 15 and 17 to the link 2, the lines 12 and 14 to the link 5, and the lines 16 and 18 to the link 6. The other parts of the third embodiment have basically the same construction as those of the first embodiment.

As described above, in the ring network of the present invention, by using the virtual concatenation technique, the working channel and the protection channel are used as a logical one band and a band in the same VC group is eliminated by the LCAS function at the troubled time. Hence, when no failure occurs on the network, a bandwidth (transmission capacity) of twice as large as that in conventional ring networks (that simply hand over the working traffic from the working channel to the protection channel when failure occurred) can be ensured. Moreover, even when failure occurs, the same bandwidth as the conventional bandwidth can be guaranteed.

Further, the ring networks in accordance with the present invention can be implemented by applying standards being standardized (LCAS function and virtual concatenation function) to the conventional SDH/SONET rings and operating the ring networks as described above.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention. For example, the protection channel can be designed to be capable of transmitting the extra traffic as in the conventional ring networks.

What is claimed is:

1. A virtual concatenation processing block, which is applied to a ring network including a working channel, a protection channel and nodes connected via the working channel and the protection channel, for connecting a layer 1 function block and a layer 2 function block of each node on the network, comprising:
   a non-failure control means for treating the working channel and the protection channel as a continuous band to conduct working traffic transmission using the band when no failure occurs on the network; and
   a failure control means for conducting the working traffic transmission using the channels of paths prepared by layer 1 protection process to avoid a troubled part when failure occurs on the network.

2. The virtual concatenation processing block of claim 1, further including:
   a failure information means for receiving failure information indicating the state of failure occurring in the network and failure recovery information indicating the recovery of the network from the failure and issuing port selection instructions based on the failure information and the failure recovery information; and
   a connection control means for controlling the connections between the layer 1 function block and the layer 2 function block by controlling its ports based on the port selection instruction supplied from the failure information means.

3. The virtual concatenation processing block of claim 1, wherein the layer 1 protection process includes ring switch process and span switch process.

4. A virtual concatenation processing block, which is applied to a ring network including a working channel, a protection channel and nodes connected via the working channel and the protection channel, for connecting a layer 1 function block and a layer 2 function block of each node on the network, comprising:
   a non-failure control means for treating the working channel and the protection channel as a continuous band by Link Capacity Adjustment Scheme (LCAS) process, and conducting working traffic transmission using the continuous band by virtual concatenation process when no failure occurs on the network; and
   a failure control means for treating the channels of paths prepared by layer 1 protection process to avoid a troubled part as a band for data transmission by the LCAS process, and conducting the working traffic transmission using the band by the virtual concatenation process when failure occurs on the network.

5. The virtual concatenation processing block of claim 4, further including:
   a failure information means for receiving failure information indicating the state of failure occurring in the network and failure recovery information indicating the recovery of the network from the failure and issuing port selection instructions based on the failure information and the failure recovery information; and
   a connection control means for controlling the connections between the layer 1 function block and the layer 2 function block by controlling its ports based on the port selection instruction supplied from the failure information means.

6. The virtual concatenation processing block of claim 4, wherein the layer 1 protection process includes ring switch process and span switch process.

7. The virtual concatenation processing block of claim 4, wherein the virtual concatenation process includes dividing data input from an upper layer into plural frames as many as virtual containers of the band, applying a mapping process to the frames to prepare mapped frames, transmitting the mapped frames using the different virtual containers, and reproducing the data from the mapped frames input via the virtual containers.

8. The virtual concatenation processing block of claim 7, wherein the mapping process includes giving a same group identification and individual sequence identifications to the frames prepared from a same data.

9. The virtual concatenation processing block of claim 8, wherein the sequence identifications of the frames having the same group identification are looked up to reproduce the data.

10. A node including a layer 1 function block and a layer 2 function block, which are connected via the virtual concatenation processing block as claimed in one of claims 1 to 9.

11. The node of claim 10, wherein the layer 1 function block executes ring switch process and span switch process as layer 1 protection process.

12. A ring network comprising a plurality of links of working channels, a plurality of links of protection channels and a plurality of the nodes as claimed in claim 11 connected via the working channels and the protection channels at a certain interval.

* * * * *